United States Patent [19]

Corbett et al.

[11] 3,900,611

[45] Aug. 19, 1975

[54] PARTICULATE MATTER SUPPRESSION USING A SOLUTION OF A SURFACTANT AND A POLYMER

[75] Inventors: Dennis Thomas Corbett, Chesterfield; John Wilson, Selston, both of England

[73] Assignee: Hemlab AG, Switzerland

[22] Filed: Mar. 9, 1973

[21] Appl. No.: 339,795

[52] U.S. Cl. ............. 427/214; 427/212; 260/29.6 H
[51] Int. Cl. .............................................. B44d 1/02
[58] Field of Search ........... 117/161 UA, 26, 6, 121; 260/29.6 H

[56] References Cited
UNITED STATES PATENTS

| | | | |
|---|---|---|---|
| 3,147,136 | 9/1964 | Huttenbach et al. | 117/26 X |
| 3,418,157 | 12/1968 | Katzer | 117/161 UA X |

FOREIGN PATENTS OR APPLICATIONS

| | | |
|---|---|---|
| 723,638 | 2/1955 | United Kingdom |

OTHER PUBLICATIONS

Chemical Abstracts Vol. 78 page 109 Article No. 31801b.

Chemical Abstracts Vol. 77 page 112 Article No. 21490q.

*Primary Examiner*—William D. Martin
*Assistant Examiner*—Dennis C. Konopacki

[57] ABSTRACT

A method for suppression of particulate matter utilizing an aqueous solution containing a non-irritant surfactant and a polymer. The surfactant is either an amphoteric surfactant alone or in combination with an anionic surfactant. The polymer is preferably selected from the group consisting of polyacrylamide, polyacrylamide and hydrolysed quaternised polyacrylamide. The solution is applied to prevent dust and particulate matter from becoming airborne.

20 Claims, No Drawings

PARTICULATE MATTER SUPPRESSION USING A SOLUTION OF A SURFACTANT AND A POLYMER

The invention relates to the prevention of dust and like particulate matter from becoming airborne, especially in confined spaces where dust represents a health hazard as well as being a nuisance, for example, in mines, such as coal mines and in asbestos plant.

One aspect of the invention involves a method of preventing movement of dust by consolidating it into a compact mass adherent to a substrate comprises applying to the dust a low or non-irritant aqueous solution containing a surfactant and a polymer. The solution itself forms another aspect of the invention.

The surfactant is non-irritating to human skin and eyes, such as an amphoteric surfactant alone or in combination with an anionic surfactant. Particularly preferred are amphoteric sulphonated mono or di-carboxylated derivatives of alkyl imidazolines of the general formula

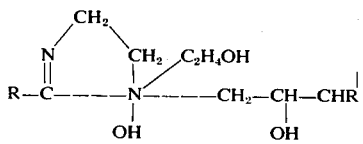

where R is the residue of a carboxylic acid such as fatty acid and R' is one of H.SO$_3$X or H. COOX or (COOX)$_2$ where X is a salt forming anion such as sodium and as anionic surfactants, sulphosuccinates of the general formula

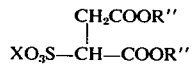

(where each R'', which may be the same or different, is an alkyl or substituted alkyl residue and X is as above).

The polymer ingredient preferably has a molecular weight of from about 50,000 to about 30 million, more preferably from about 100,000 to 20 million, above all 1 to 15 million. The polymer is preferably a homo or copolymer of a substituted or unsubstituted amide, amine, imine, ethylene - imine or ethoxy residue. Preferred are polyacrylamide, hydrolysed polyacrylamide and quaternised polyacrylamide.

Most preferably, the non-irritant solution contains more of the surfactant than the polymer since the stability of the solution at low temperatures is thereby enhanced. Where the surfactant comprises the amphoteric surfactant alone, this is preferably present in a weight ratio relative to the polymer of equal amounts to 70 parts surfactant to 1 part polymer. The preferred weight ratio ranges from 10 parts surfactant to 1 part polymer, up to 70 parts surfactant to 1 part polymer. When the surfactant comprises both an amphoteric surfactant and an anionic one, the corresponding weight ratio for the total surfactant component is equal parts surfactant and polymer to 100 parts surfactant to 1 part polymer. The preferred weight ratios here range from 3 to 1 in favor of the surfactant to 7 to 1 in favor of the surfactant.

Preferably the aqueous solution is made by blending the polymer and surfactant together at normal room temperature conveniently by dissolving the polymer in water in a ratio of from about 1:70 to 1:1000 to form a viscous concentrate which is mixed with the surfactant to form an aqueous concentrate; this may contain about 0.1 to about 10 percent by weight of polymer, about 1 to about 99 percent by weight of surfactant and the balance water.

Ionic materials, such as sodium carbonate and trisodium phosphate may be included in the solution of concentrations of 0.01 to 10 percent by weight to assist in reducing the viscosity.

The solution is applied to the dust by spraying, injecting, sprinkling or brush. It may be applied to a vehicle for the dust, e.g. a quenching water sprayed on to a coal face so that when coal dries the dust is trapped on the coal or mining equipment.

Preferably the dust to be consolidated and the substrate on which it is to form a crust are liberally prewetted with water. Slow heated drying at surface temperatures below about 90°C. tends to enhance the formation of a strong crust.

Using an aqueous solution of the invention it is possible to consolidate dust on a substrate into a load bearing mass which can stay in consolidated condition for a prolonged period.

For example, in treating coal dust in a mine gallery using the method of the invention, the dust can be consolidated into a compact mass on the floor of the gallery which mass can support the weight of pedestrian traffic for a relatively prolonged period without crumbling. Evaluations, as reported below, show evidence of an interaction between the polymer and the surfactant which gives an enhanced consolidative effect.

The invention includes for use in the method low or non-irritant aqueous solutions containing both a polymer and a surfactant, the latter being preferably an amphoteric surfactant and preferably in a greater concentration than the polymer.

While there is a rather brief reference in British Pat. No. 723,638 (page 4, column 2) to the addition of a polymer and a surface active agent in the solution, nevertheless. the British Patent does not in any way suggest the use of a non-irritant surfactant of the types contemplated by the present invention or the specific conditions constituting the present invention.

Examples of the invention are given by way of illustration only.

EXAMPLE I

A concentrate was prepared by mixing together 1g of partially hydrolysed polyacrylamide (molecular weight 15 million) and 15g of an amphoteric sulphonated surfactant in 84g water. The concentrate was added to water in a weight ratio of 1:500 and the whole mixed with agitation to form a solution which was tested as reported in the evaluation below.

EXAMPLE II

A concentrate was prepared by mixing together 0.5g of a partially quaternised polyacrylamide (molecular weight 5 million) and 9g of an amphoteric carboxylated surfactant and 0.5g trisodium ortho-phosphate in 90g of water. The concentrate was added to water in a weight ratio of 1:150 and the whole mixed with agitation to ensure complete dispersion. The solution formed was tested as reported in the evaluation below.

EXAMPLE III

A concentrate was prepared by mixing together 1g of partially hydrolysed acrylamide/acrylate copolymer (molecular weight 8 million) and 99g of a dicarboxylated amphoteric surfactant of 65% activity. The concentrate was added to water in a weight ratio of 1:1000 and the whole mixed with agitation to ensure complete dispersion. The solution formed displayed a good dust consolidative effect.

EXAMPLE IV

A concentrate was prepared by mixing together 1.5g of partially quaternised polyacrylamide (molecular weight 2 million) and 20g of a surfactant blend comprising 15g of an ester of sulphosuccinic acid and 5g carboxylated amphoteric surfactant in 78.5g water.

The concentrate was added to water in a weight ratio of 1:750 and the whole mixed with agitation to ensure complete dispersion. The solution formed displayed a good dust consolidative effect.

EXAMPLE V

A concentrate was prepared by mixing together 0.8g polyacrylate (molecular weight 4 million) and 15g of a surfactant blend comprising 12g of an ester of sulphosuccinic acid and 3g carboxylated amphoteric surfactant and 5g sodium tetraborate and 79.2g of water.

The concentrate was added to water in a weight ratio of 1:20 and the whole mixed with agitation to ensure complete dispersion. The solution formed displayed a good dust consolidative effect when tested in a coal mine.

EXAMPLE VI

A concentrate was prepared by mixing together 1g of a copolymer of methacrylamide and acrylamido propylbenzyl dimethyl ammonium chloride and 30g of a surfactant blend comprising 25g of an amphoteric sulphonated surfactant and 5g of a sulphosuccinic ester in 69g of water.

The concentrate was added to water in a weight ratio of 1:200 and the whole mixed with agitation to ensure complete dispersion. The solution formed displayed a good dust consolidative effect.

EVALUATION

Batches of Kaolin dust (average particle size less than 25 micron) were spread on pans. The samples were subjected to a standard uniform spray of the treatments listed below. The treated batches were dried for 72 hours at 20°C. and then subjected to a controlled and measurable wind velocity. The results are shown below:

| TREATMENT | WIND VELOCITY (MPH) TO RUPTURE THE TREATED SURFACE | COMMENTS |
| --- | --- | --- |
| Control | 0.5 | No adhesion |
| Water | 2 – 4 | Virtually no adhesion |
| 1g Partially hydrolysed polyacrylamide molecular wt (15,000,000) 99g water | 10 – 20 | Very poor covering properties, poor adhesion |
| 15g of amphoteric sulphonated surfactant | 2 – 4 | Virtually no adhesion |
| Formulation of Example I | 70 – 75 | Excellent adhesion and covering properties |
| Control | Less than 0.5 | No adhesion |
| Water | Less than 0.5 | No adhesion |
| 0.5g partially quaternised polyacrylamide (molecular wt 5,000,000) 99.5g water | 8 – 10 | Very poor covering properties, poor adhesion |
| 0.5g trisodium ortho phosphate 99.5g water | Less than 0.5 | No adhesion |
| 9g amphoteric carboxylated surfactant 91g water | Less than 0.5 | No adhesion |
| 0.5g partially quaternised polyacrylamide (molecular wt 5,000,000) 0.5g trisodium ortho phosphate 99g water | 14 – 16 | Poor covering properties, poor adhesion |
| 9g amphoteric carboxylated surfactant 0.5g trisodium ortho phosphate 90.5g water | Less than 0.5 | No adhesion |
| Formulation of Example II | 60 – 65 | Excellent adhesion and covering properties |

The results show that only when the polyacrylamide and surfactant are used together is the dust sufficiently stabilised to resist substantial wind velocity.

Without further elaboration, the foregoing will so fully illustrate our invention that others may, by applying current or future knowledge, readily adapt the same for use under various conditions of service.

What is claimed as the invention is:

1. A method of preventing the movement of particulate matter which comprises applying to the particulate matter an amount sufficient to consolidate the particulate matter into a compact mass adherent to a selected substrate, of an aqueous solution which is non-irritating to humans, which solution comprises a surfactant selected from the group consisting of an amphoteric surfactant and an amphoteric surfactant in combination with an anionic surfactant, and a homo- or co-polymer of an unsubstituted or substituted amide, amine, imine or ethoxy residue having a molecular weight of from about 50,000 to about 30,000,000, in a weight ratio of 10:1 to 70:1 when the surfactant is an amphoteric surfactant and 3:1 to 7:1 when the surfactant is an amphoteric surfactant in combination with an anionic surfactant.

2. A method according to claim 1 which further comprises pre-wetting the particulate matter and substrate with water.

3. A method according to claim 1 wherein the homo- or co-polymer has a molecular weight of from about 100,000 to 20 million.

4. A method according to claim 3 wherein the homo- or co-polymer has a molecular weight of from about 1 million to about 15 million.

5. A method according to claim 1 wherein the homo- or co-polymer is polyacrylamide, hydrolyzed polyacrylamide or quaternized polyacrylamide.

6. A method according to claim 1 wherein the surfactant is an amphoteric surfactant.

7. A method according to claim 6 wherein the amphoteric surfactant is of the formula $$\begin{array}{c} \phantom{R-C}\diagup CH_2 \diagdown \\ N \phantom{-C-----N}CH_2\phantom{-}C_2H_4OH \\ \phantom{R-}\parallel \phantom{-----N}\diagdown \phantom{--}\diagup \\ R-C-----N-----CH_2-CH-CHR' \\ \phantom{R-C-----}| \phantom{-----CH_2-CH-}| \\ \phantom{R-C-----}OH \phantom{-----CH_2-CH}OH \end{array}$$

wherein
R is the residue of a carboxylic acid and
R' is X—SO$_3$X, HCOOH or (COOX)$_2$
wherein
X is a salt forming anion.

8. A method according to claim 1 wherein the surfactant is an amphoteric surfactant in combination with an anionic surfactant.

9. A method according to claim 8 wherein the amphoteric surfactant is of the formula $$\begin{array}{c} \phantom{R-C}\diagup CH_2 \diagdown \\ N \phantom{-C-----N}CH_2\phantom{-}C_2H_4OH \\ \phantom{R-}\parallel \phantom{-----N}\diagdown \phantom{--}\diagup \\ R-C-----N-----CH_2-CH-CHR' \\ \phantom{R-C-----}| \phantom{-----CH_2-CH-}| \\ \phantom{R-C-----}OH \phantom{-----CH_2-CH}OH \end{array}$$

wherein
R is the residue of a carboxylic acid and
R' is X—SO$_3$X, HCOOH or (COOX)$_2$
wherein
X is a salt forming anion,
and the anionic surfactant is of the formula $$\begin{array}{c} CH_2COOR'' \\ | \\ XO_3S-CH-COOR'' \end{array}$$

wherein
each R'' is the same or different alkyl or substituted alkyl residue and
X is above defined.

10. A method according to claim 1 wherein said solution comprises about 1 to about 99 percent by weight of the surfactant, about 0.1 to about 10 percent by weight of the homo- or co-polymer and the balance water.

11. A method according to claim 10 wherein said solution additionally contains 0.01 to 10 percent by weight of an ionic material capable of reducing the viscosity of the solution.

12. A method according to claim 11 wherein the ionic material is sodium carbonate, sodium tetraborate or trisodium phosphate.

13. A method according to claim 1 wherein the surfactant is a sulphonated amphoteric surfactant, a carboxylated amphoteric surfactant, a dicarboxylated amphoteric surfactant, a combination of a carboxylated amphoteric surfactant and a sulpho-succinic acid ester, or a combination of a sulphonated amphoteric surfactant and a sulpho-succinic acid ester, and the homo- or co-polymer is partially hydrolyzed polyacrylamide, partially quaternized polyacrylamide, polyacrylate, a partially hydrolyzed acrylamide/acrylate copolymer or a methacrylamide/acrylamide propylbenzyl dimethyl ammonium chloride copolymer.

14. A method according to claim 11 wherein the ionic material is trisodium ortho-phosphate or sodium tetraborate.

15. A method according to claim 1 wherein the surfactant is an amphoteric surfactant, the homo- or co-polymer is partially hydrolyzed polyacrylamide having a molecular weight of 15 million and the weight ratio of amphoteric surfactant to partially hydrolyzed polyacrylamide is 15:1.

16. A method according to claim 1 wherein the surfactant is a carboxylated amphoteric surfactant, the homo- or co-polymer is partially quaternized polyacrylamide having a molecular weight of 5 million and the solution further contains trisodium ortho-phosphate, and the weight ratio of amphoteric surfactant to partially quaternized polyacrylamide to trisodium ortho-phosphate is 18:1:1.

17. A method according to claim 15 wherein the surfactant is a dicarboxylated amphoteric surfactant of 65 percent activity, the homo- or co-polymer is partially hydrolyzed acrylamide/acrylate copolymer having a molecular weight of 8 million and the weight ratio of amphoteric surfactant to copolymer is 99:1.

18. A method according to claim 1 wherein the surfactant is a combination of a carboxylated amphoteric surfactant and a sulpho-succinic acid ester in a weight ratio of 1:3, the homo- or co-polymer is partially quaternized polyacrylamide having a molecular weight of 2 million and the weight ratio of surfactant to partially quaternized polyacrylamide is 40:3.

19. A method according to claim 1 wherein the surfactant is a carboxylated amphoteric surfactant in combination with a sulpho-succinic acid ester in a weight ratio of 1:4, the homo- or co-polymer is polyacrylate having a molecular weight of 4 million, the solution also contains sodium tetraborate, and the weight ratio of surfactant to polyacrylate to sodium tetraborate is 75:4:25.

20. A method according to claim 1 wherein the surfactant is a sulphonated amphoteric surfactant in combination with a sulpho-succinic acid ester in a weight ratio of 5:1, the homo- or co-polymer is methacrylamide/acrylamide propylbenzyl dimethyl ammonium chloride copolymer and the weight ratio of surfactant to copolymer is 30:1.

* * * * *

UNITED STATES PATENT OFFICE
CERTIFICATE OF CORRECTION

Patent No. 3,900,611    Dated August 19, 1975

Inventor(s) DENNIS THOMAS CORBETT and JOHN WILSON

It is certified that error appears in the above-identified patent and that said Letters Patent are hereby corrected as shown below:

In the Abstract:

Line 6, before "poly-" insert -- hydrolysed --

Column 1, line 25; column 5, line 13; and column 5, line 32, in each occurrence, the terminal methylene group should read -- CHR' --

Signed and Sealed this twenty-fifth Day of November 1975

[SEAL]

Attest:

RUTH C. MASON
*Attesting Officer*

C. MARSHALL DANN
*Commissioner of Patents and Trademarks*